United States Patent [19]

Leyshon et al.

[11] Patent Number: 5,254,326
[45] Date of Patent: Oct. 19, 1993

[54] PRODUCTION OF HYDROGEN PEROXIDE

[75] Inventors: David W. Leyshon; Robert J. Jones; Robert N. Cochran, all of West Chester, Pa.

[73] Assignee: ARCO Chemical Technology, L.P., Wilmington, Del.

[21] Appl. No.: 34,320

[22] Filed: Mar. 22, 1993

[51] Int. Cl.$^5$ .............................................. C01B 15/026
[52] U.S. Cl. .................................... 423/591; 568/320
[58] Field of Search .......................... 423/591; 568/320

[56] References Cited

U.S. PATENT DOCUMENTS

| | | |
|---|---|---|
| 2,871,102 | 1/1959 | Rust et al. ............................ 423/591 |
| 2,871,103 | 1/1950 | Skinner et al. ....................... 423/591 |
| 2,871,104 | 1/1959 | Rust ..................................... 423/591 |
| 3,118,733 | 1/1964 | Sampson .............................. 423/591 |
| 3,351,635 | 11/1967 | Kollar .................................. 423/591 |
| 4,303,632 | 12/1981 | Gesser .................................. 423/591 |
| 4,897,085 | 1/1990 | Cochran et al. ...................... 423/591 |
| 4,897,252 | 1/1990 | Cochran et al. ...................... 423/591 |
| 4,975,266 | 12/1990 | Albal et al. .......................... 423/591 |
| 4,994,625 | 2/1991 | Albal et al. .......................... 423/591 |
| 5,039,508 | 8/1991 | Cochran et al. ...................... 423/591 |
| 5,041,680 | 8/1991 | Albal et al. .......................... 423/591 |
| 5,194,067 | 3/1993 | Albal et al. .......................... 423/591 |

*Primary Examiner*—James H. Reamer
*Attorney, Agent, or Firm*—William C. Long

[57] ABSTRACT

Hydrogen peroxide is produced by liquid phase molecular oxidation of methyl benzyl alcohol in an oxidation zone, product hydrogen peroxide being recovered as vapor from the oxidation zone.

2 Claims, 1 Drawing Sheet

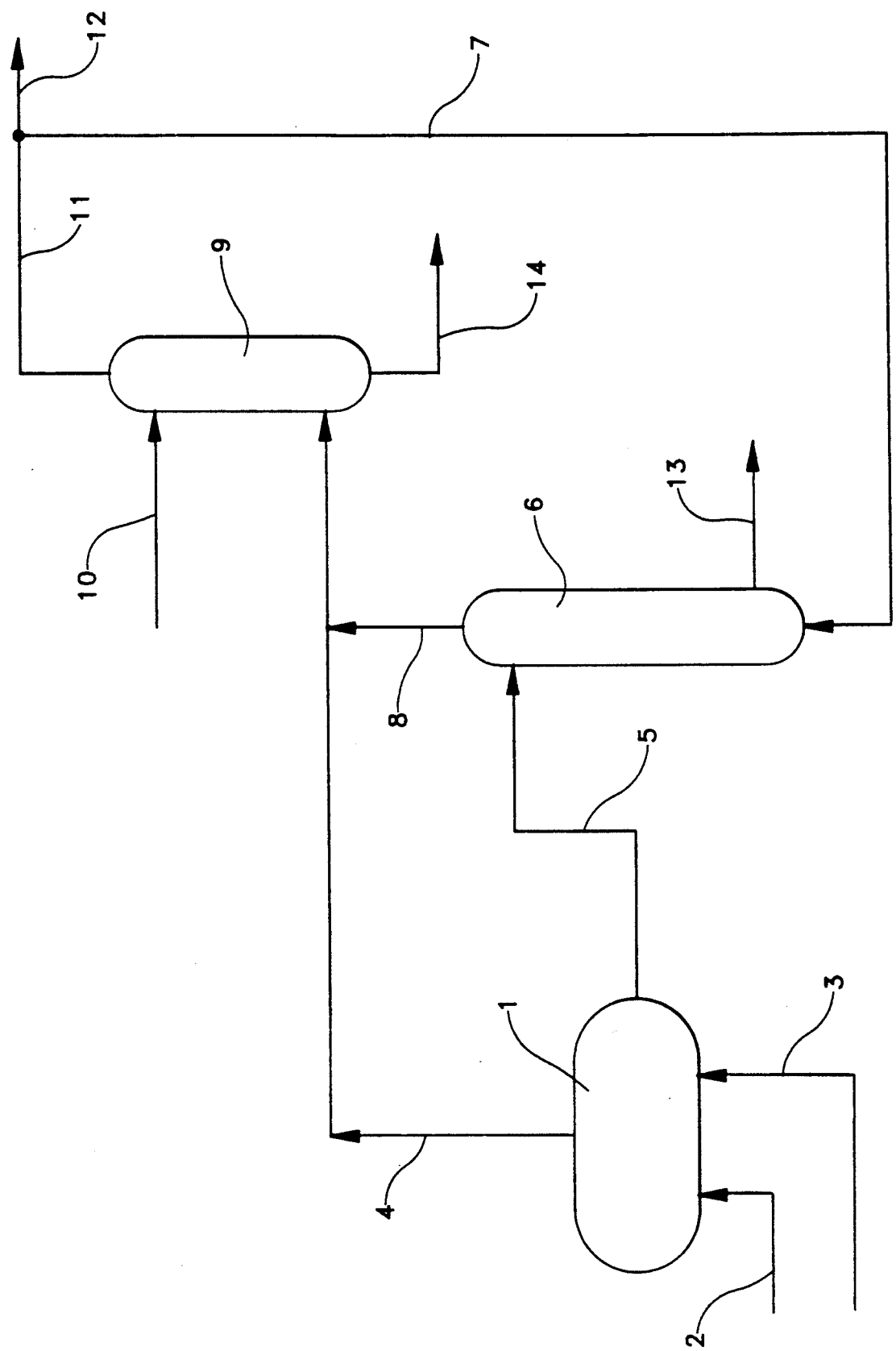

PRODUCTION OF HYDROGEN PEROXIDE

BACKGROUND OF THE INVENTION

1. Field of the Invention

The present invention relates to the production of hydrogen peroxide by the oxidation of methyl benzyl alcohol.

2. Description of the Prior Art

Hydrogen peroxide is an important chemical of commerce which is produced in very large quantities for use in a number of industrial applications. The predominant process used commercially for the production of hydrogen peroxide involves the oxidation of anthrahydroquinone, extraction of hydrogen peroxide and reduction of the resulting anthraquinone to anthrahydroquinone which is reused. This process requires very high capital expenditures in that use of a working solvent with efficient recycle of various process components is a necessity.

Substantial efforts have been directed to processes which involve direct combination of hydrogen and oxygen but thus far such processes have not found widespread success.

Hydrogen peroxide has been formed by the oxidation of secondary alcohols. At one time the production of hydrogen peroxide by oxidation of isopropanol was practiced commercially. Other secondary alcohols which have been mentioned as possible starting materials for hydrogen peroxide production include methyl benzyl alcohol and cyclohexanol. See, for example, U.S. Pat. Nos. 2,871,102-4 of Shell Development.

Hydrogen peroxide has also been formed by oxidation of high boiling secondary alcohols such as diaryl methanol, the product hydrogen peroxide being stripped from the reaction mixture during oxidation; see U.S. Pat. No. 4,303,632.

In certain commercial technologies, there are produced substantial quantities of various secondary alcohols. For example, in the coproduction of propylene oxide and styrene monomer by hydroperoxide epoxidation, methyl benzyl alcohol is formed and ultimately converted by dehydration to styrene monomer. See U S. Pat. No. 3,351,635.

U.S. Pat. No. 4,897,252 describes an improved process for the oxidation of methyl benzyl alcohol to hydrogen peroxide including control of the water concentration in the reaction mixture below 4% by weight. Related U.S. Pat. Nos. 5,041,680, 5,039,508, 4,994,625, 4,975,266 and 4,897,085 are also generally concerned with this technology.

The present invention provides a further improvement in this technology.

SUMMARY OF THE INVENTION

In accordance with the invention, there is provided an improved process for the production of hydrogen peroxide by oxidation of methyl benzyl alcohol. In particular, the process of this invention involves the production of hydrogen peroxide by molecular oxygen oxidation of methyl benzyl alcohol in the liquid phase with the recovery of product hydrogen peroxide from the vapor stream which is recovered from the oxidation reaction zone.

BRIEF DESCRIPTION OF THE DRAWING

The accompanying drawing illustrates in schematic form a suitable embodiment of the invention.

DETAILED DESCRIPTION OF THE INVENTION

In accordance with the teachings of the prior art, the oxidation of methyl benzyl alcohol (also referred to as alpha phenyl ethanol, 1-phenyl ethanol or methyl phenyl carbinol) to produce hydrogen peroxide has been carried out at relatively high pressure with product hydrogen peroxide being removed as liquid from the oxidation zone.

In accordance with the present invention, the methyl benzyl alcohol oxidation is carried out in the liquid phase at elevated temperatures and pressures, but product hydrogen peroxide is continuously stripped from the liquid reaction mixture during the reaction, removed as vapor from the oxidation zone, and recovered.

In an especially preferred embodiment of the invention, hydrogen peroxide production can be integrated with the Oxirane process for the production of propylene oxide and styrene monomer by epoxidation of propylene with ethyl benzene hydroperoxide. In this embodiment, feed to the methyl benzyl alcohol oxidation comprises a methyl benzyl alcohol/acetophenone process stream from the propylene oxide and styrene monomer process.

The oxidant which is used in the present invention is molecular oxygen. Air is a convenient source of the oxygen although oxygen-enriched air, oxygen diluted with various inerts such as argon, carbon dioxide, and the like can also be used.

The conditions of temperature and pressure are such as to maintain the reaction mixture in the liquid phase while permitting hydrogen peroxide removal as vapor. Elevated temperatures ranging from about 100°-250° C., preferably 120°-180° C. are employed to achieve reasonable reaction rates.

Total pressure in the reaction zone should be sufficient to maintain the reaction mixture in the liquid phase while stripping a vapor stream comprised of hydrogen peroxide from the reaction zone. Generally, pressures in the range of 15 psig to 500 psig are useful, preferably 50 psig to 200 psig.

It is important to provide partial pressures of oxygen sufficient to maintain reasonable reaction rates. A preferred range is 5 psi to 15 psi partial pressure of oxygen in the oxidizer effluent, with a broader useful range being 1 psi to 30 psi.

Metal contaminants and other materials which promote peroxide decomposition are to be avoided in the reaction zone. Known peroxide stabilizers such as pyrophosphates are useful and can be employed.

The oxidation of methyl benzyl alcohol to hydrogen peroxide and acetophenone is an exothermic reaction which requires removal of the heat of reaction. This is conveniently accomplished by the vaporization of components of the reaction mixture including hydrogen peroxide and removal of the vapor from the reaction zone. In practice of the invention, low water concentrations are maintained in the liquid reaction mixture, i.e. water concentration below 4 wt. %, preferably below 2 wt. % and most preferably below 1 wt. % water in the reaction mixture as described in U.S. Pat. No. 4,897,252.

Care should be exercised to ensure that the vapor from the oxidation zone has a non-flammable composition; if needed, additional nitrogen or other inert can be added.

The invention can be further described with reference to the attached drawing which illustrates in schematic form an especially preferred embodiment. Referring to the drawing, a methyl benzyl alcohol feed stream is introduced into oxidation zone 1 by means of line 2. Preferably, the methyl benzyl alcohol stream is a process stream from a commercial process for propylene oxide/styrene monomer coproduction comprised mainly of methyl benzyl alcohol, acetophenone and ethyl benzene combined with methyl benzyl alcohol from acetophenone hydrogenation as described in U.S. Pat. No. 4,897,252, the disclosure of which is incorporated herein by reference. A molecular oxygen-containing stream, preferably air, is introduced into zone 1 via line 3.

In zone 1 a liquid reaction mixture is maintained wherein methyl benzyl alcohol reacts with molecular oxygen to form hydrogen peroxide. Generally, temperatures in the range of about 100°–250° C., preferably 120°–180° C. are suitable for this reaction.

As an essential feature of the present invention, however, during the reaction vapors containing hydrogen peroxide and other components of the reaction mixture are continuously removed from zone 1 by means of line 4. This is conveniently accomplished by maintaining an appropriate pressure in reaction zone 1 and through the use of a stripping gas such as the nitrogen in the air feed; of course, other stripping gases can be used, but nitrogen is by far the most convenient. As above indicated, oxidation zone pressures in the range of 50 to 500 psig are suitable.

In addition to the vapor stream exiting zone 1 via line 4, a liquid reaction mixture stream is removed from zone 1 via line 5. This liquid stream comprises hydrogen peroxide, acetophenone, and methyl benzyl alcohol. The liquid stream passes to stripper 6 wherein most of the hydrogen peroxide contained therein is stripped from the liquid reaction mixture. A stripping gas, preferably a primarily nitrogen-containing recycle gas, is introduced into stripper 6 via line 7 to aid in stripping hydrogen peroxide from the liquid reaction mixture.

In preferred practice, the overhead from stripper 6 comprised of hydrogen peroxide and stripping gas exits stripper 6 via line 8 and is combined with the vapor stream from oxidation zone 1. The combined stream passes to scrubber 9 wherein hydrogen peroxide is scrubbed from the vapors by means of water which is introduced to scrubber 9 via line 10.

A vapor stream comprised mainly of nitrogen is removed from scrubber 9 via line 11, a portion is purged via line 12 and the remainder is recycled via line 7 to stripper 6 for further hydrogen peroxide stripping.

A liquid organics stream is removed from stripper 6 via line 13. This stream mainly comprises acetophenone, which is a product of the oxidation, and methyl benzyl alcohol. Preferably, the stream is treated in accordance with known procedures for decomposition of peroxidic materials and conversion of acetophenone to methyl benzyl alcohol, and this methyl benzyl together with the unreacted methyl benzyl alcohol from zone 1 can be dehydrated to styrene monomer or recycled to the oxidation reaction.

An aqueous hydrogen peroxide containing stream is recovered from scrubber 9 via line 14. This stream contains, in addition to hydrogen peroxide, water as well as methyl benzyl alcohol and acetophenone. Conveniently, this stream is subjected to ethyl benzene extraction as described in U.S. Pat. No. 4,897,085, the disclosure of which is incorporated herein by reference, and a product aqueous hydrogen peroxide stream is recovered.

In accordance with the present invention, about 5 to 70%, preferably 10 to 40%, of the hydrogen peroxide produced in oxidation zone 1 is removed as vapor from zone 1 with the remainder being removed via the liquid reaction product stream. This removal of hydrogen peroxide as vapor has a number of significant advantages over prior practices where the hydrogen peroxide was recovered exclusively from the liquid reaction product stream.

The operating pressure of the oxidation zone is substantially reduced which results in significant reductions in equipment and operating costs.

The levels of higher boiling water soluble impurities in the recovered aqueous hydrogen peroxide stream are substantially reduced as compared to previous practice since the primary separation of these materials is by vapor-liquid equilibrium rather than liquid-liquid equilibrium.

The amount of ethyl benzene needed in the extractive separation of the hydrogen peroxide from methyl benzyl alcohol and acetophenone is greatly reduced due to the fact that hydrogen peroxide is separated from the great bulk of the methyl benzyl alcohol and acetophenone by the stripping procedures above described before ethyl benzene extraction.

Removal of hydrogen peroxide of vapor from the oxidation zone also results in stripping water from the reaction mixture which in turn improves the reaction and reduces potential hazards.

The following example illustrates practice of the invention. Unless otherwise indicated, units are parts by weights per hour and percentages are weight percent.

EXAMPLE

Referring to the accompanying drawing, a methyl benzyl alcohol feed stream is introduced into reactor 1 by means of line 2. The oxidant used in this example is air which is introduced into zone 1 by means of line 3. The oxidation reaction in zone 1 is carried out in the liquid phase; conditions in the oxidation zone are maintained at 130° C. and 75 psig.

A vapor stream comprised of nitrogen, unreacted oxygen, methyl benzyl alcohol, acetophenone and containing product hydrogen peroxide is continuously removed from zone 1 by means of line 4. A liquid reaction mixture stream is likewise continuously removed from zone 1 by means of line 5.

The liquid reaction mixture stream passes via line 5 to stripper 6 wherein hydrogen peroxide is stripped from the liquid reaction mixture and passes overhead via line 8 to scrubber 9. Conditions in stripper zone 6 involve maintaining the stripper overhead at 140° C. and 15 psig. The stripping gas is primarily a recycle nitrogen stream derived from scrubber 9 as hereinafter described.

The vapor stream from stripper 6 is combined with the vapor stream exiting zone 1 via line 4 and the combined stream passes to scrubber wherein hydrogen peroxide is scrubbed from the mixture by means of water which is introduced via line 10. Conditions in scrubber 9 are 40° C. and 15 psig. A vapor stream is removed from scrubber 9 via line 11 and primarily comprises the non-condensible unreacted nitrogen and oxygen. A portion of the stream is purged via line 12, while the remainder is recycled to stripper 6 via line 7.

A liquid stream containing the product hydrogen peroxide product in accordance with the invention is separated via line 14 and passed to ultimate recovery of hydrogen peroxide which is carried out in accordance with known procedures. A liquid stream comprised mainly of methyl benzyl alcohol and acetophenone is recovered from stripper 6 via line 13 and is worked up and/or converted to styrene monomer in accordance with known procedures.

The flow rates and compositions of the major components of the various streams are shown in the following Table 1.

TABLE 1

| Component | Stream lb./hr.: | | | | | | | | | | |
|---|---|---|---|---|---|---|---|---|---|---|---|
| | 2 | 3 | 4 | 5 | 7 | 8 | 10 | 11 | 12 | 13 | 14 |
| MBA | 113054 | — | 2778 | 76360 | — | 2898 | — | — | — | 68462 | 10676 |
| ACP | 5800 | — | 1346 | 37013 | — | 3888 | — | — | — | 33185 | 5174 |
| $H_2O_2$ | — | — | 1511 | 6045 | — | 5894 | — | — | — | 151 | 7405 |
| $H_2O$ | — | — | 768 | 230 | — | 230 | 9930 | 1413 | 1243 | — | 9685 |
| $O_2$ | — | 10054 | 1726 | — | 1962 | 1962 | — | 3688 | 1726 | — | — |
| $N_2$ | — | 33095 | 32793 | 302 | 37288 | 37288 | — | 70081 | 32793 | 302 | — |
| Others | — | — | 50 | 1385 | — | 143 | — | — | — | 1242 | 193 |

From a consideration of the composition of the hydrogen peroxide stream recovered via line 14, it can be seen that through practice of the invention the hydrogen peroxide has been separated from the great bulk of methyl benzyl alcohol and acetophenone. An appropriate further purification of the product hydrogen peroxide stream is by ethyl benzene extraction in accordance with the procedures set forth in U.S. Pat. No. 4,897,252. An outstanding advantage of the present invention is that in such an ethyl benzene recovery procedure, the amount of ethyl benzene needed to accomplish efficient separation of an aqueous hydrogen peroxide stream from ethyl benzene and other organics stream is only a small fraction of the amount of ethyl benzene which is required in prior processes by reason of the fact that the hydrogen peroxide in stream 14 has, at that point, already been separated from the bulk of the organics. For example, on a comparable basis, where all of the net hydrogen peroxide is recovered in the liquid stream from the oxidizer, of the order of 5 times as much ethyl benzene is required in the hydrogen peroxide work-up as compared to the amount necessary in treating the product stream recovered in line 14 in accordance with the present invention.

From the above it can be seen that the present invention results in substantially improved economics when contrasted with prior procedures.

We claim:

1. In a process for the production of hydrogen peroxide wherein methyl benzyl alcohol is reacted with molecular oxygen in the liquid phase in an oxidation zone to form hydrogen peroxide and a vapor stream is removed from the oxidation zone during the reaction, the improvement which comprises recovering about 5-70% of the product hydrogen peroxide from said vapor stream from the oxidation zone.

2. A process according to claim 1 wherein the concentration of water in the liquid phase is maintained below 4% by weight during the reaction.

* * * * *